Nov. 20, 1928.
S. OSSER
1,692,761
MAGNETIC MOTOR
Filed June 21, 1926
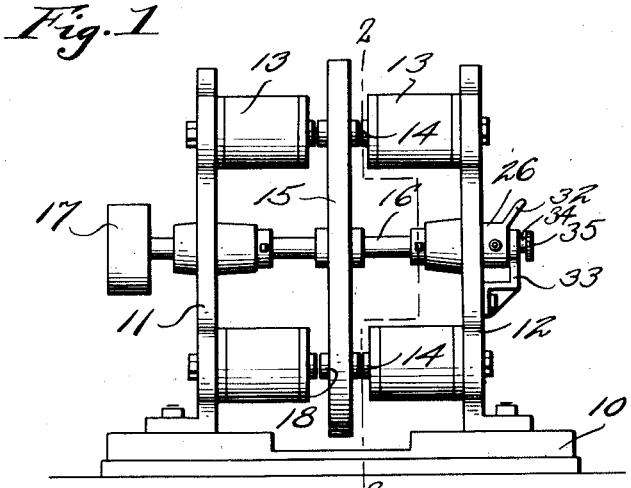
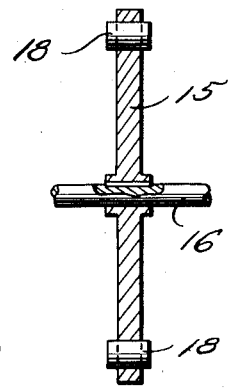
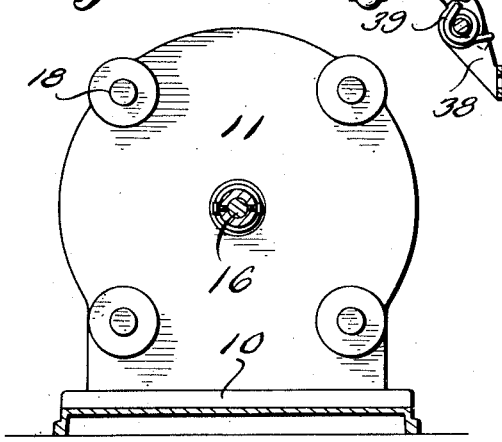
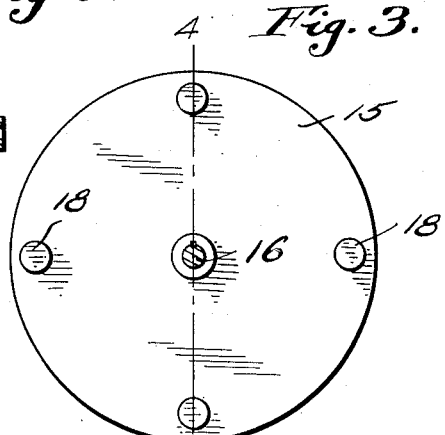
Sidney Osser
INVENTOR
BY Victor J. Evans
ATTORNEY
WITNESS: A. E. Wise Patented Nov. 20, 1928.

1,692,761

UNITED STATES PATENT OFFICE.

SIDNEY OSSER, OF WICHITA, KANSAS.

MAGNETIC MOTOR.

Application filed June 21, 1926. Serial No. 117,554.

The object of this invention is to provide a motor in which the field comprises a plurality of series of electro-magnets positioned on opposite sides of a rotor of disk form, said rotor including an element of non-magnetic material, carrying magnetic pole pieces of iron or the like acted upon by the poles of the field magnets oppositely located, for imparting movement to the rotor at a speed determined by the position of the moving poles at the time the poles of the field are most intensely energized.

A further object is to provide for varying the relative position of the poles of the electrically energized field and the magnetic portions or pole pieces of the rotor, so that the rotor may be slowed down, reversed, and thereafter caused, by a continuation of movement of the shifting means in the same direction, to pick up speed at any rate desired within the limits of the mechanism.

A further object is to provide a motor in which a uniform horsepower will be developed at different speeds.

With the foregoing and other objects in view, the invention consists in the novel construction and arrangement of elements described, illustrated and claimed, it being understood that modifications may be made within the scope of the claims without departing from the spirit of the invention.

In the drawings forming part of this application,

Figure 1 is a view of the machine in elevation.

Figure 2 constitutes a vertical section on line 2—2 of Figure 1, the four field magnets on one side of the machine appearing in elevation, these magnets constituting one-half of the stator.

Figure 3 shows the rotor in side elevation, (this element appearing in Figure 1 in edge elevation).

Figure 4 is a section on line 4—4 of Figure 3.

Figure 5 is a diagrammatic view showing the connections for the field magnets and showing, chiefly in section, the means for distributing current to the magnets of the field.

Figure 6 is a detail view showing the pivoted and spring held contact device of Figure 5.

Figure 7 is a detail view showing the mounting of the housing for the contact and timing mechanism of Figure 5.

Carried by the heavy metallic base 10 are the frame members 11 and 12 of the stator unit, these elements, together with the elements of the field providing a complete magnetic circuit.

The field magnets 13 are arranged in two series, one series being carried by element 11, and the other series by element 12, and the poles of the magnets being shown at 14, the poles of oppositely located magnets being spaced as indicated in Figure 1.

The rotor includes a disk or plate member 15 of non-magnetic material, and mounted rigidly on shaft 16, this shaft carrying a pulley wheel 17 by means of which power may be transmitted thru a belt, for use in any manner desired. Carried by disk 15 are a plurality of elements 18 of iron or the like proportioned to pass between the poles 14 of oppositely located magnets, said elements 18 extending entirely thru disk 15. These elements 18 constitute in a sense individual armatures for each pair of magnets 13, oppositely located, and a magnetic circuit is completed thru elements 18, and thru poles 13, frame elements 11 and 12 and base 10.

In Figure 5 each field magnet has a coil grounded at 19, and each coil is connected with a wire 20, on one side of the field, the coils of the magnets of the other side of the field being connected with wire 21, and these wires or conductors 20 and 21 merge into or are connected with wire 22 leading to an adjustable terminal 25 insulated from housing 26. Another insulated terminal on said housing 26 is designated 27 and is connected by wire 28 with one terminal 29 of battery 30, the opposite terminal of the battery being grounded at 31.

Housing 26 may be shifted angularly with reference to the axis of rotation of the rotor, by means of handle 32, in order to change the position of the timing mechanism. Said housing 26 carries a hub portion 34 extending thru bracket 33, and a threaded clamping element 35 engaging the hub portion, and the surface of bracket 33, maintains the housing 26 in an adjusted position.

A contact arm 37 includes a contact end portion 37' cooperating with terminal 25, and arm 37 is mounted on bracket 38, and is resiliently held by spring 39.

Arm 37 is controlled in part by a cam structure including four cam heads 16' rigid with reference to main shaft 16, all of the magnets of the field being energized simultaneously during each quarter revolution of shaft 16, at which time contact point 37' and terminal 25 are in direct cooperation.

A main switch 40 in conductor 29 controls the flow of current to the field, and a switch 42 is connected by wire 45 with wire 28 and cooperates with contact 44 connected by wire 45 with wire 22. Switch 42 provides for the constant energization of the field, as distinguished from the intermittent energization thereof, and this constant flow of current produces a braking action because the magnetic elements 18 of the rotor will be retarded during their passage between the magnetized poles 14 of the field.

The number of magnets in the field may be varied as desired, and the time of energization of these magnets with respect to the position of the magnetic elements or poles 18 of the rotor determine the speed of the rotor, since the brief interval required for the response of the magnetic elements 18 to the influence of the field magnets varies in accordance with the length of the gap at the moment of most intense energization of the poles 14 of the field. The speed may be lessened by increasing the gap by shifting the timing mechanism, and by shifting the timing mechanism until a neutral point is passed, the direction of rotation will be reversed.

Having described the invention what is claimed is:—

1. In a motor, a field comprising a series of magnets, a second series of magnets having their poles in alinement with the poles of the magnets first named, mounting means for the magnets including spaced frame members and a base mounting the frame members, said members and base forming part of a magnetic circuit common to all alined magnets, means for electrically energizing the magnets of the field simultaneously and intermittently, a rotor mechanically independent of said means of energization, the rotor being mounted between the poles and including an element of non-magnetic material and individual members of magnetic material for completing a magnetic circuit between oppositely located poles of the magnets.

2. In a motor, a field comprising a series of magnets, a second series of magnets having their poles in alinement with the poles of the magnets first named, mounting means for the magnets including spaced frame members and a base mounting the frame members, said members and base forming part of a magnetic circuit common to all alined magnets, a rotor mounted between the poles, said rotor including an element of non-magnetic material and individual elements of magnetic material carried thereby and adapted to complete a magnetic circuit between oppositely located poles of the magnets, and cam operated contact means for energizing all of the magnets of the field.

3. In a motor, a field comprising a series of magnets, a second series of magnets having their poles opposite the poles of the magnets first named, mounting means for the magnets including spaced frame members and a base mounting the frame members, said members and base forming part of a magnetic circuit common to all alined magnets, cam operated means for electrically energizing the magnets of the field simultaneously and intermittently, a rotor mechanically independent of said means of energization, and mounted between the poles, the rotor including an element of non-magnetic material and elements of magnetic material carried thereby, and adapted to complete a magnetic circuit between oppositely located poles of the magnets.

4. In a motor, a field comprising a series of magnets, a second series of magnets having their poles opposite the poles of the magnets first named, mounting means for the magnets including spaced frame members and a base mounting the frame members, said members and base forming part of a magnetic circuit common to all alined magnets, devices for electrically energizing the magnets of the field simultaneously and intermittently, a rotor mechanically independent of said means of energization, and mounted between the poles, the rotor including an element of non-magnetic material and elements of magnetic material carried thereby, and adapted to complete a magnetic circuit between oppositely located poles of the magnets, and means for energizing the magnets continuously for an interval for braking purposes.

In testimony whereof I affix my signature.

SIDNEY OSSER.